No. 710,422. Patented Oct. 7, 1902.
M. H. BUTLER & C. A. LARSON.
VEGETABLE WASHER.
(Application filed Sept. 17, 1900.)
(No Model.)

Witnesses
Howard D. Orr.
Geo. H. Chandlee.

M. H. Butler
C. A. Larson, Inventors.
By C. A. Snow & Co.
Attorneys

THE NORRIS PETERS CO., PHOTO-LITHO., WASHINGTON, D. C.

UNITED STATES PATENT OFFICE.

MILTON H. BUTLER AND CARL A. LARSON, OF CHERRYCREEK, NEW YORK.

VEGETABLE-WASHER.

SPECIFICATION forming part of Letters Patent No. 710,422, dated October 7, 1902.

Application filed September 17, 1900. Serial No. 30,325. (No model.)

*To all whom it may concern:*

Be it known that we, MILTON H. BUTLER and CARL A. LARSON, citizens of the United States, residing at Cherrycreek, in the county of Chautauqua and State of New York, have invented a new and useful Vegetable-Washer, of which the following is a specification.

Our invention relates to certain improvements in vegetable-washers, and has for its object to provide a device of simple and economical construction by which fruit and vegetables may be thoroughly washed without injury and automatically drained and discharged from the machine into a suitable receptacle.

With these and other objects in view the invention consists in the novel construction and combination of parts hereinafter described, illustrated in the accompanying drawings, and particularly pointed out in the appended claim.

Figure 1:
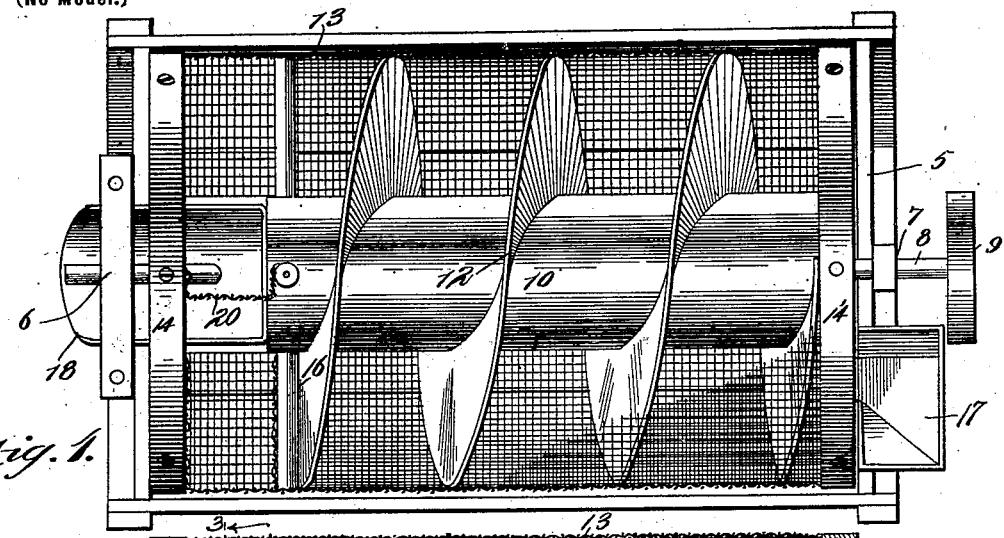
Figure 2:
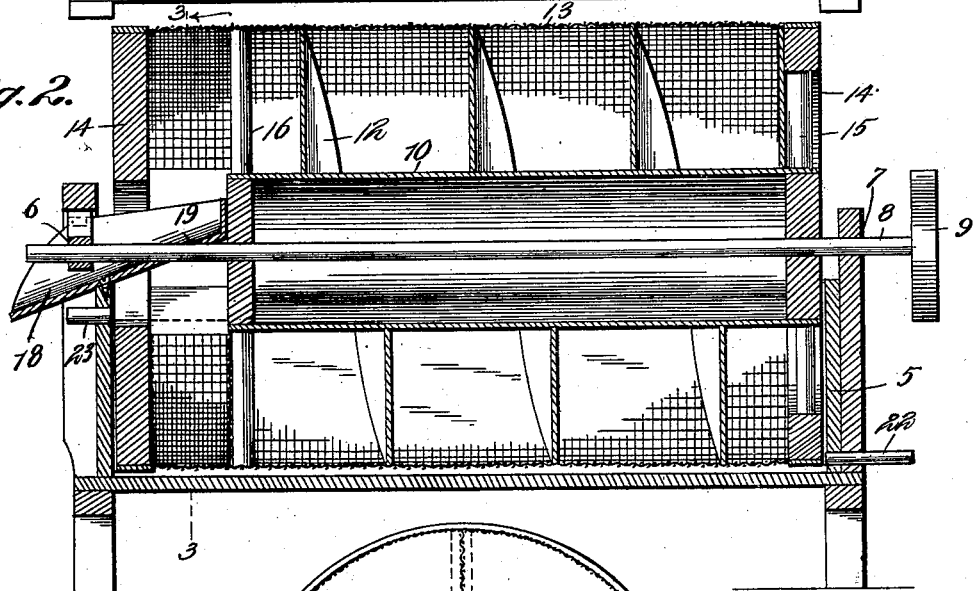
Figure 3:
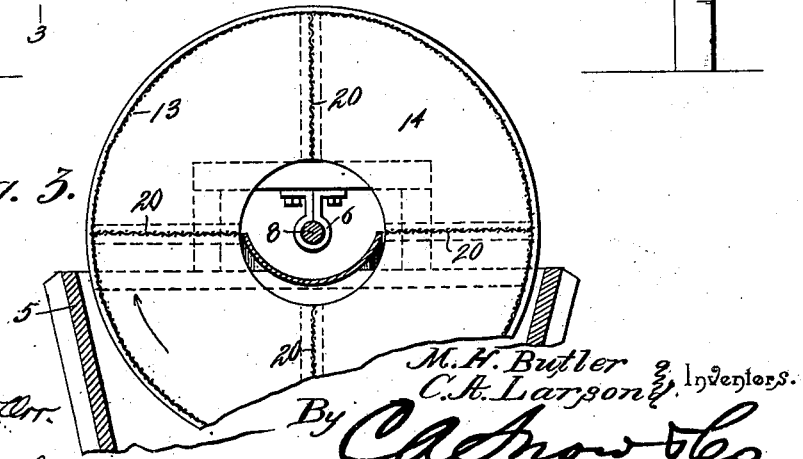

In the drawings, Figure 1 is a plan view of a vegetable-washing machine constructed in accordance with our invention, a portion of the outer foraminous cylinder being broken away in order to more clearly illustrate the interior parts. Fig. 2 is a longitudinal sectional elevation of the same. Fig. 3 is a transverse sectional elevation of the machine on the line 3 3 of Fig. 2.

Similar numerals of reference are employed to indicate corresponding parts throughout the several figures of the drawings.

5 designates a suitable tank or trough having at its opposite ends bearings 6 and 7 for the support of a horizontally-disposed shaft 8, the latter being provided at one end with a driving-pulley 9. On the shaft 8 is secured a closed cylinder 10, having a perfectly smooth exterior surface to prevent injury to the fruit or vegetables, said cylinder being somewhat shorter than the tank and so arranged that its lower portion will be slightly below the water-line. On the cylinder 10 is secured a helical flange or screw 12, which progresses from one end of the cylinder to the other, and this helical flange supports a cylindrical foraminous casing 13, the opposite ends of which are secured to circular end pieces 14 and 14'. The end piece 14' is in the form of a ring and is supported by spokes 15, extending radially from the closed cylinder in order to afford spaces for the introduction of the vegetables or fruit to the space between the two cylinders. From the opposite end of the closed cylinder 10, which is considerably shorter than the cylinder 13, extend a series of spokes 16, secured to both cylinders and serving as a support for the outer cylinder, that portion of the outer cylinder projecting beyond the end of the cylinder 10 being of sufficient strength to support the end disk 14, the latter being closed to prevent the escape of fruit or vegetables from the outer cylinder except at the central portion, where a small opening is provided for the introduction of a discharge-chute 18, which is partly supported in position by the shaft 8, the latter passing through an opening 19 near the inner end of said chute. At the opposite end of the machine is arranged a suitable feed hopper or chute 17, adapted to deliver the fruit or vegetables into the space between the two cylinders.

At the discharge end of the machine are arranged a number of buckets 20, each consisting of a section of foraminous material bent into scoop shape and having its opposite sides secured, respectively, to the inner surface of the disk 14 and one of the spokes 16, said buckets being of sufficient length to extend from the periphery of the inner cylinder 10 to the outer cylinder 13 and serving to elevate the fruit or vegetables from the water and discharge the same into the chute 18, the water being drained from the vegetables during the movement above the water-line.

At one end of the tank, preferably at the feed end, is a water-supply pipe 22, and at the discharge end is a water-discharge 23, the latter being arranged in about the horizontal plane of the closed cylinder for the purpose of maintaining a constant level of water at a point slightly above the extreme lower edge of said cylinder, so that the fruit or vegetables which may rise to the top of the water will be prevented from floating from one side of the cylinder to the other.

The helical flange 12 extends from the closed cylinder to the outer foraminous cylinder and forms what may be considered a series of chambers along the length of the shorter cylinder, there being no passage for the fruit or vegetables except that afforded by following the helical line of the flange. In this manner the vegetables may be retained in the water for any desired length of time and subjected to a longer or shorter washing action in accordance with the character and condition of the fruit or vegetables being treated. As both the inner cylinder and the helical flange have perfectly smooth surfaces, there will be no abrading or grating action whatever on any of the floating fruits or vegetables, and those which by reason of their greater specific gravity sink to the lower portion of the outer cylinder will be rolled to some extent by the cylinder, but will be protected from abrasion by the water. At the end of the closed cylinder the vagetables are discharged into the space occupied by the buckets 20 and are carried by said buckets up above the water-line and drained and thence discharged into the chute 18.

In order to thoroughly wash the vegetables or fruit, we prefer to maintain a constant flow of water from end to end of the tank and in the same direction as that followed by the vegetables during their travel through the machine.

Having thus described our invention, what we claim is—

In a machine for washing vegetables and fruit, the combination of a water-tank, a horizontal shaft, a closed cylinder carried by the shaft and presenting a smooth peripheral surface, a smooth-surfaced helical flange secured to the periphery of the cylinder and extending throughout its length, a foraminous cylinder secured to the peripheral edge of said flange and projecting beyond its discharge end, a disk 14 to which the delivery end of the outer cylinder is secured, a series of radial spokes connecting the end of the closed cylinder with the outer cylinder, radial foraminous delivery-buckets extending from the inner to the outer cylinder and having their opposite edges connected to the spokes and the disk 14 respectively, a discharge-spout extending through a central opening in the disk and receiving the drained product from the foraminous buckets, a water-supply at the feed end of the tank, and a water-discharge provided at the discharge end of the tank in about the horizontal plane of the lower portion of the closed cylinder, for maintaining a constant water-level and a constant flow in the direction of travel of the vegetables.

In testimony that we claim the foregoing as our own we have hereto affixed our signatures in the presence of two witnesses.

MILTON H. BUTLER.
CARL A. LARSON.

Witnesses:
GEO. W. OSWILL,
L. C. LANGWORTHY.